United States Patent [19]

Ezawa et al.

[11] Patent Number: 5,663,843
[45] Date of Patent: Sep. 2, 1997

[54] OPTICAL SYSTEM DRIVING APPARATUS

[75] Inventors: Hiroshi Ezawa, Sagamihara; Tetsuo Ikegame, Hachioji, both of Japan

[73] Assignee: Olympus Optical Company, Ltd., Tokyo, Japan

[21] Appl. No.: 625,012

[22] Filed: Mar. 29, 1996

[30] Foreign Application Priority Data

Mar. 31, 1995 [JP] Japan .................... 7-075200

[51] Int. Cl.[6] ........................... G02B 7/02
[52] U.S. Cl. ................. 359/824; 359/814; 369/44.15; 369/247
[58] Field of Search ................. 359/824, 823, 359/814, 813; 369/44.15, 44.16, 247, 248

[56] References Cited

U.S. PATENT DOCUMENTS

| 4,592,037 | 5/1986 | Ohmuki | 369/44.15 |
|---|---|---|---|
| 4,613,202 | 9/1986 | Kuriyama | 369/44.15 |
| 4,794,580 | 12/1988 | Ikedo et al. | 369/44.16 |
| 5,206,762 | 4/1993 | Kasahara et al. | 359/814 |

FOREIGN PATENT DOCUMENTS

| 60-48377 U | 4/1985 | Japan . |
|---|---|---|
| 3-144924A | 6/1991 | Japan . |
| 6-7449Y2 | 2/1994 | Japan . |

*Primary Examiner*—Loha Ben

[57] ABSTRACT

An optical system driving apparatus including a holder 2 supporting an objective lens 1, resilient supporting members 29a, 29b for supporting the holder movably in a focusing direction Z perpendicular to a record medium, and focusing coils 4a, 4b secured to the holder 2 by means of viscoelastic members 3a and 3b. The focusing coils 4a, 4b and a viscoelastic members 3a, 3b serve as a dynamic damper so that undesired resonance can be effectively suppressed without narrowing a control frequency range.

9 Claims, 11 Drawing Sheets

FIG_4

FIG_5

FIG._8
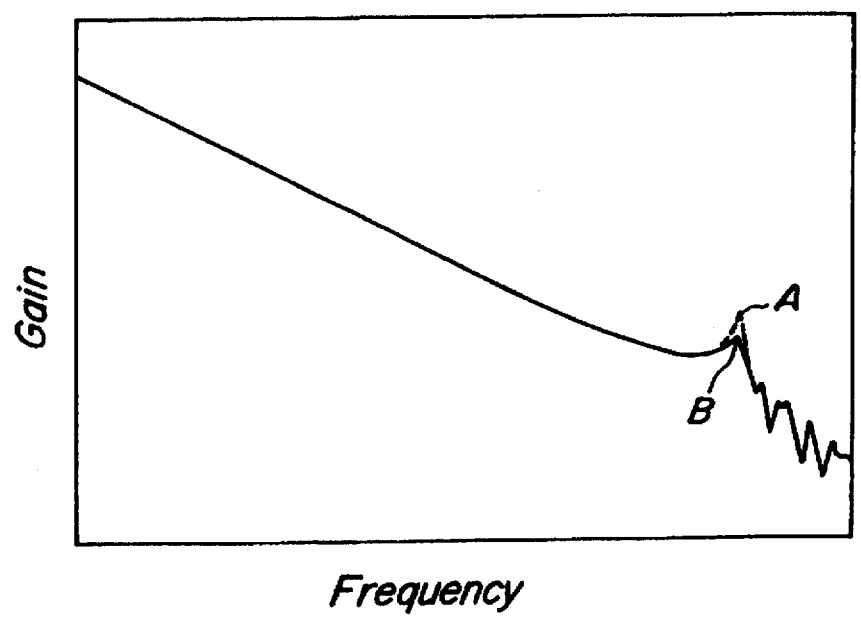
FIG._9
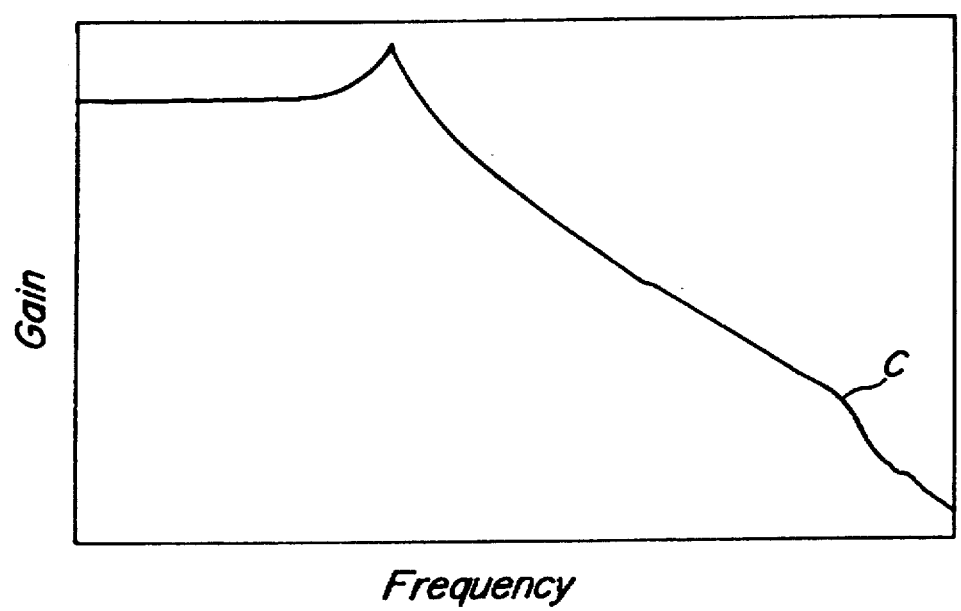

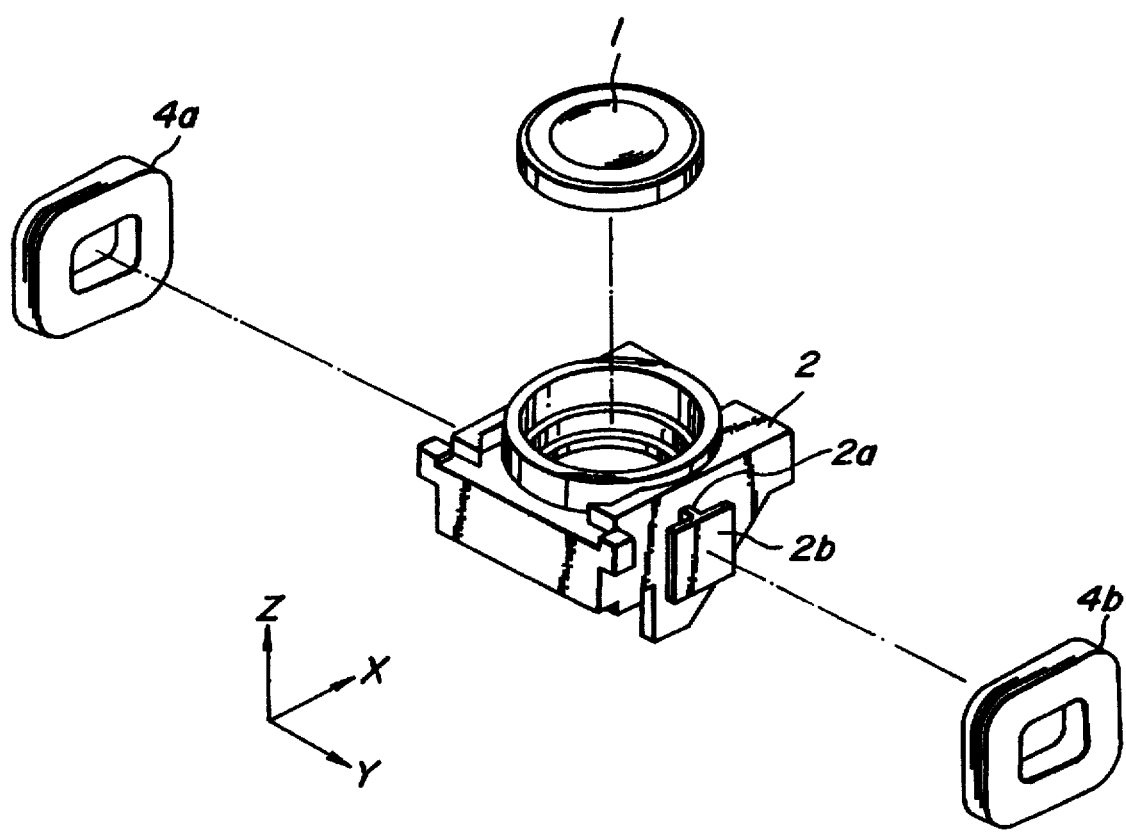
FIG_12 ns. 5,663,843

OPTICAL SYSTEM DRIVING APPARATUS

BACKGROUND OF THE INVENTION

1. Field of the Invention

The present invention relates to an apparatus for driving an optical system for use in an optical recording and reproducing apparatus.

2. Related Art Statement

An apparatus for driving an optical system for use in an optical recording and reproducing apparatus generally comprises a focusing mechanism for moving an optical element, e.g. an objective lens in a focusing direction which is perpendicular to a plane of an optical record medium and a tracking mechanism for moving the optical element in a tracking direction which is perpendicular both to the focusing direction and to a direction of a track formed on the record medium. The focusing mechanism serves to compensate a vibration of the record medium in a direction perpendicular to the plane of the record medium. Since this vibration of the record medium is small, the optical element is usually supported movably by means of a spring mechanism. In the tracking mechanism, the optical element is moved to follow an information track on an optical record disc by moving the optical element in a radial direction, and thus the optical element is usually supported by a combination of shafts and bearings such as radial bearings and slide bearings.

FIG. 1 is a perspective view showing a known optical system driving apparatus. In FIG. 1, an objective lens (optical element) 91 is supported by a holder 92 and the holder is secured to a carriage 94 by a pair of leaf springs 93a and 93b movably in a focusing direction Z. The carriage 94 is supported by a pair of shafts 96a and 96b by means of bearings 95a and 95b, respectively movably in a tracking direction X. The shafts 96a and 96b are supported by a stationary member not shown.

In this known optical system driving apparatus, by applying a driving force to the carriage 94 in the tracking direction X, the objective lens 91 can be moved in the tracking direction X together with the carriage 94. By applying a driving force to the holder 92 in the focusing direction Z, the objective lens 91 can be moved in the focusing direction Z.

In the known optical system driving apparatus illustrated in FIG. 1, the movement of the objective lens 91 in the focusing direction Z is performed by directly applying the driving force to the holder 92 which holds the objective lens 91. However, the movement of the objective lens 91 in the tracking direction X is carried out indirectly by means of the leaf spring 93a and 93b, because the driving force is applied to the carriage 94 instead of to the holder 92. It should be noted that the leaf springs 93a and 93b are used to move the objective lens 91 in the focusing direction Z, and thus they should have weak stiffness in the focusing direction Z. Furthermore, the leaf springs 93a and 93b have rather weak stiffness in the tracking direction X.

Therefore, in the known optical system driving apparatus shown in FIG. 1, when the objective lens 91 is moved in the tracking direction X, an undesired resonance might occur due to the leaf springs 93a and 93b and an accurate tracking control could not be performed. If this undesired resonance is suppressed, a dynamic control frequency range might be narrowed. This apparently degrades the performance of the apparatus.

The above mentioned undesired resonance of the leaf springs 93a and 93b becomes large when carriage 94 is moved in the tracking direction X. However, even when the objective lens 91 is moved in the focusing direction Z, there might occur a resonance due to a deviation between a driving force applying point and a point of gravity of the holder 92 which is moved in the focusing direction Z. In this manner, not only the tracking control, but also the focusing control could not be performed accurately. It should be further noted that the above mentioned undesired phenomenon occurs not only in the apparatus shown in FIG. 1, but also in another known optical system driving apparatuses in which the holder holding the objective lens is supported by resilient members such as four wires or leaf springs movably in the focusing direction Z as well as in the tracking direction Z.

Recently the optical system driving apparatus has been required to be small in size and light in weight, so that stiffness of the holder 92 and carriage 94 is liable to be weak. Then, not only the springs 93a and 93b, but also the holder 92 and carriage 94 might be subjected to undesired resonance and the focusing control and tracking control could not be carried out accurately. For instance, when the holder 92 might be subjected to a resonance, not only the control in the tracking direction X but also the control in the focusing direction Z are influenced, and thus the performance of the driving apparatus is decreased to a large extent.

In Japanese Utility Model Application Publication Kokai Hei 6-7449, there is proposed an optical system driving apparatus, in which the undesired resonance is damped by providing a weight via a vibration absorbing member to a carriage. In this known apparatus, the vibration absorbing member is made of a material having a resilient damping property and viscose damping property, and therefore the vibration absorbing member serves as a dynamic damper and the resonance is effectively suppressed. However, in this known apparatus, only the resonance of the carriage to which the dynamic damper is secured can be suppressed, and thus if this measure is applied to the known apparatus shown in FIG. 1, the resonance of the leaf springs 93a, 93b and holder 92 could not be suppressed at all.

It should be noted that the dynamic damper may be applied to the holder 92. Then, the resonance of the holder 92 and objective lens 91 due to the resonance of the leaf springs 93a and 93b could be suppressed. However, in this case, a weight of the holder 92 is increased and the resonance frequency is decreased. Therefore, a wide control frequency range could not be attained.

In Japanese Patent Application Publication Kokai Hei 3-144924, there is shown another known optical system driving apparatus, in which a balancer is secured to an objective lens holder by means of an adhesive agent to take a balance with respect to the objective lens. In this apparatus, the balancer serves as a damper and the undesired resonance is suppressed.

However, if such a balancer is applied to the holder 92 of the apparatus shown in FIG. 1, a weight of the holder might be increased and a resonance frequency might be lowered. Therefore, the control frequency range might be narrow and the performance of the apparatus might be decreased. A part of the holder may be divided and a divided part is secured to the remaining holder by means of an adhesive agent. In this case, the divided part may serve as the damper. However, a weight of the divided portion is light, so that it could not serve as the damper effectively.

In Japanese Utility Model Application Publication Kokai Sho 60-48377, there is disclosed a voice coil motor for driving a carriage, in which the coil is secured to the carriage by means of damping member. In this apparatus, a resonance of the coil itself can be suppressed, but a resonance of the carriage could not be suppressed.

SUMMARY OF THE INVENTION

The present invention has for its object to provide a novel and useful optical system driving apparatus, in which undesired resonance can be effectively suppressed by a simple and less expensive measure, while a sufficiently wide control frequency range can be obtained.

According to the invention, an optical system driving apparatus comprises:

a holder means for holding an optical system;

a supporting means for supporting a resiliently said holder means movably in a first direction which is substantially perpendicular to a record medium and/or a second direction which is substantially perpendicular to said first direction;

a coil means secured to said holder means for driving said holder means in said first and/or second direction; and a viscoelastic means for securing at least a part of said coil means to said holder means.

In a preferable embodiment of the optical system driving apparatus according to the invention, said viscoelastic means comprises a viscoelastic member which is formed by a molding together with the holder means. Then, the number of parts is not increased and an assembling cost can be decreased.

In order to attain a stable servo control characteristic without narrowing the control frequency range, it is preferable that the viscoelastic means is so constructed that a stiffness in a direction in which the coil produces a driving force is larger than a stiffness in another direction.

According to the invention, the coil means is secured to the holder means by means of the viscoelastic means, and thus the coil means and viscoelastic means serve as a dynamic damping member. Among parts secured to the holder means, the coil means has a relatively large weight so that the coil means effectively serves as the dynamic damper. Therefore, the resonance of the holder means due to the resilient supporting means can be effectively suppressed and at the same time a resonance transferred to the holder means by means of the resilient supporting means can be also effectively suppressed. Since only the viscoelastic means is provided, the apparatus becomes simple and less expensive. An increase in weight of the holder means is limited only to the viscoelastic means having a small weight, so that the decrease in the resonance frequency due to the increase in weight becomes very small. In this manner, according to the invention, it is possible to attain a wide dynamic control frequency range up to a very high frequency, and thus the performance of the apparatus becomes very high.

BRIEF DESCRIPTION OF THE DRAWINGS

FIG. 8 is a graph representing a frequency characteristic of the tracking control;

FIG. 9 is a graph expressing a frequency characteristic of the focusing control;

FIG. 12 is an exploded perspective view showing a third embodiment of the optical system driving apparatus according to the invention.

DESCRIPTION OF THE PREFERRED EMBODIMENTS

FIGS. 2–9 show a first embodiment of the optical system driving apparatus according to the invention.

Figure 4:
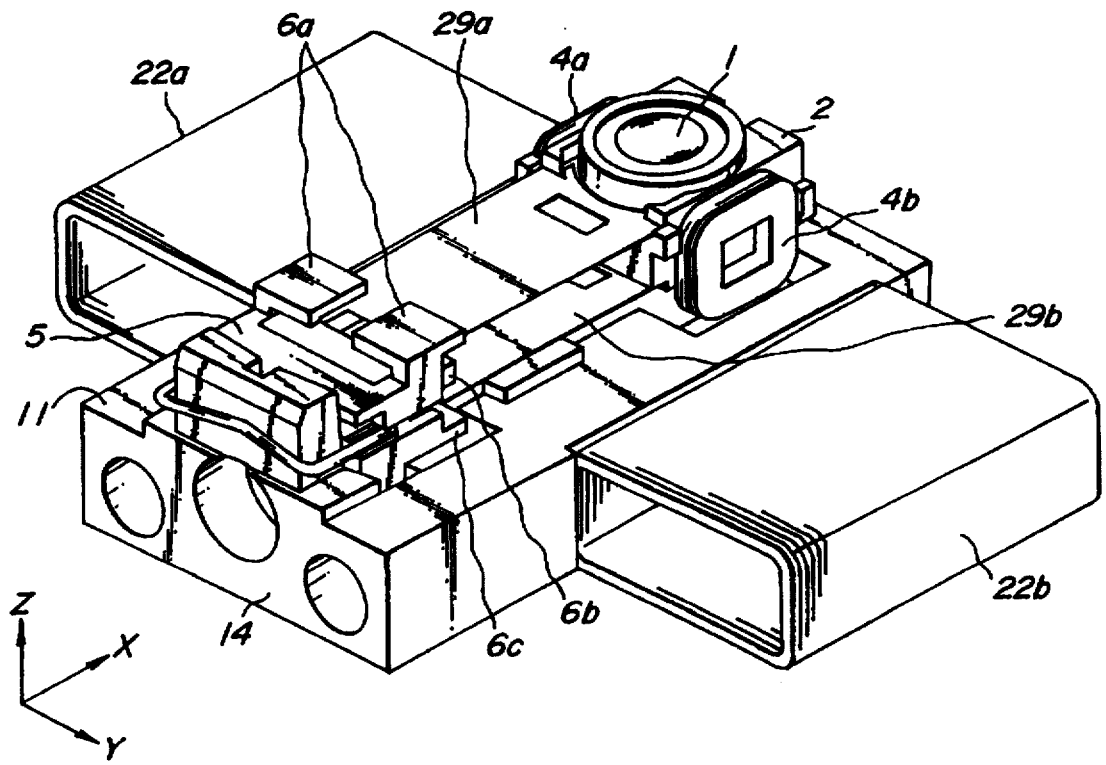
FIG. 4 is a perspective view showing a portion of the apparatus of FIG. 2.
Figure 5:
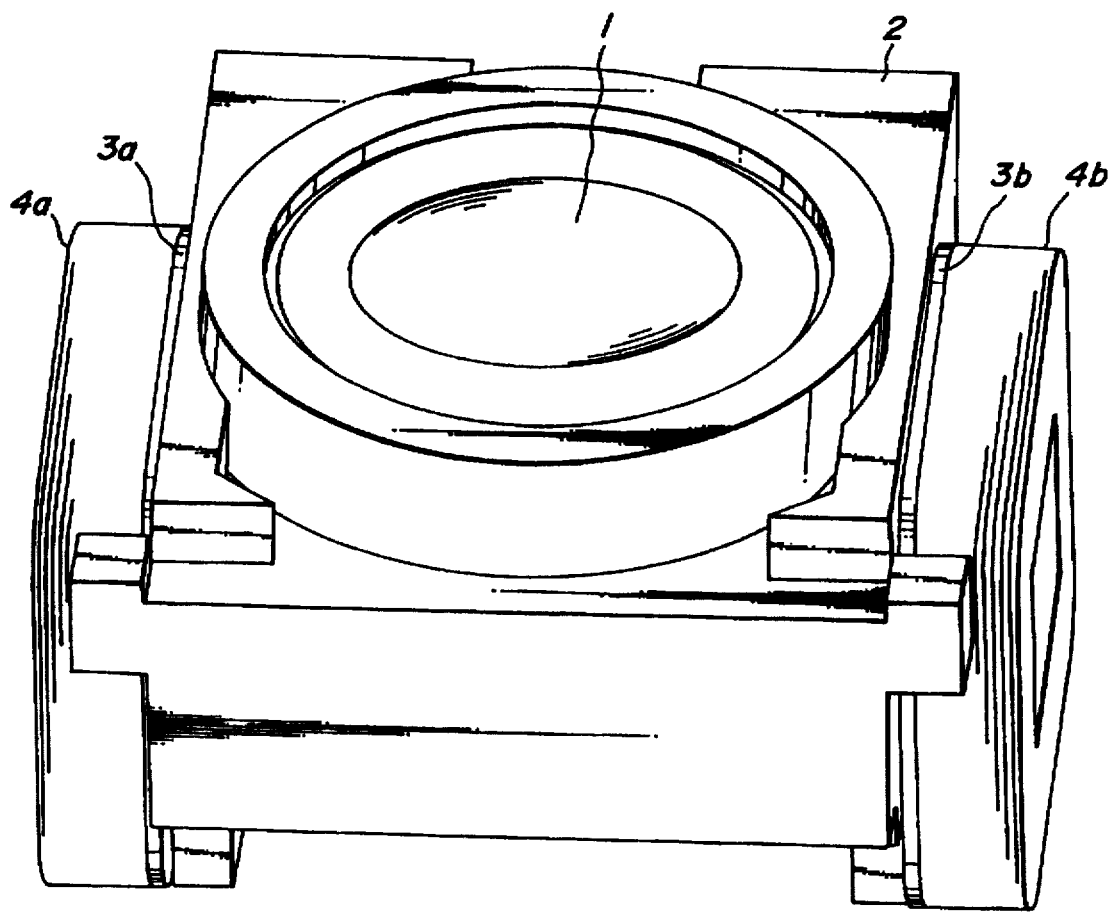
FIG. 5 is a perspective view depicting a portion of the apparatus shown in FIG. 2.
Figure 6:
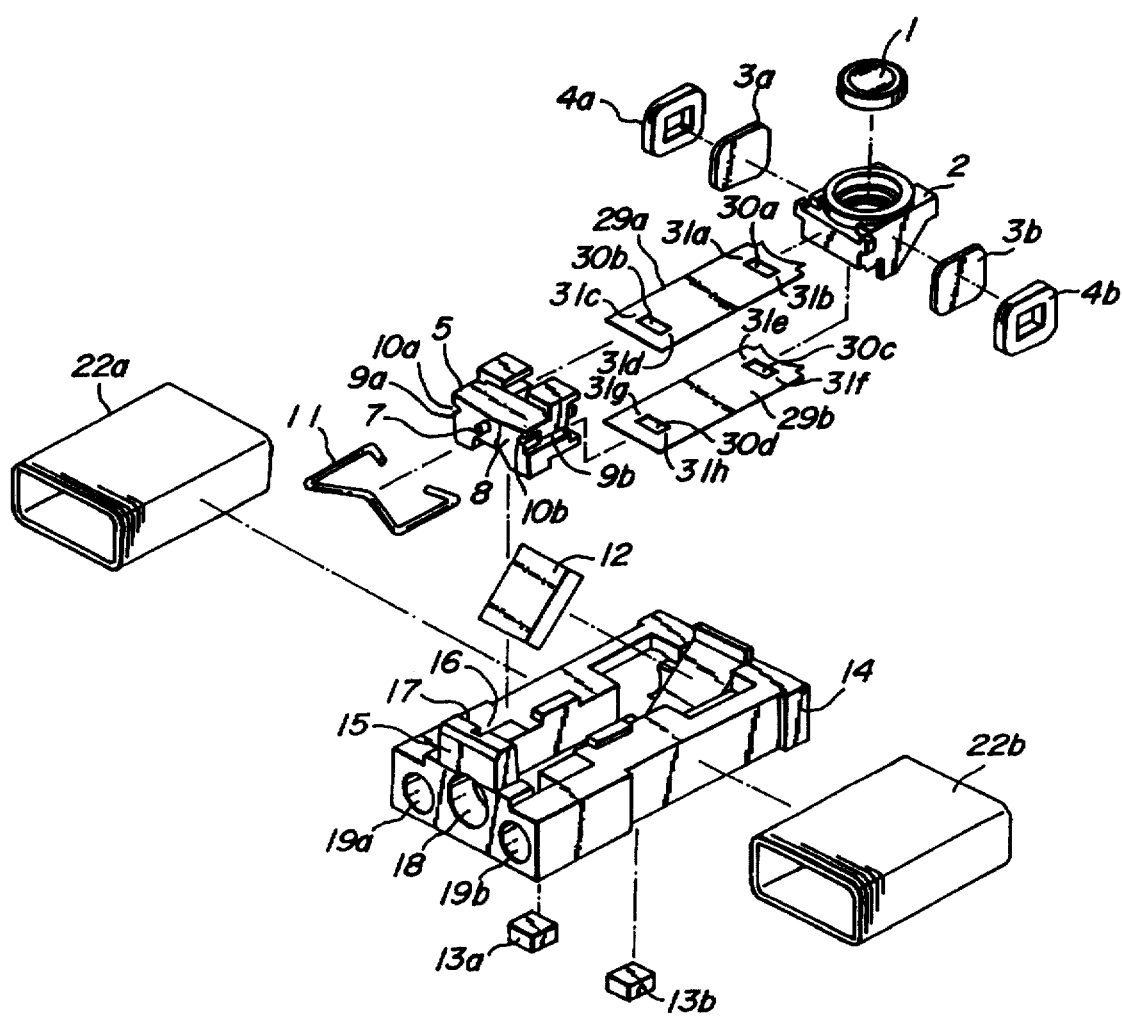
FIG. 6 is an exploded perspective view of the apparatus shown in FIG. 2.

As shown in FIGS. 4–6, an objective lens 1 is secured to a holder 2 by means of an adhesive agent. Focusing coils 4a and 4b are secured to side walls of the holder 2 by means of viscoelastic sheet-like members 3a and 3b, respectively, said side walls facing to +Y and −Y directions. The viscoelastic members 3a and 3b are made of acrylic high polymer. One ends of a pair of leaf springs 29a and 29b are secured to a side wall of the holder 2, said side wall facing to a tracking direction X. The leaf springs 29a and 29b are separated from each other in a focusing direction Z. The leaf springs 29a and 29b may be manufactured by etching a metal sheet.

The leaf springs 29a and 29b have formed at both end portions rectangular openings 30a–30d to form narrow portions 31a–31h as best shown in FIG. 6. Therefore, the leaf springs 29a and 29b are bent mainly at these narrow portions 31a–31h. The other ends of the leaf springs 29a and 29b are secured to a spring receptacle 5 by means of an adhesive agent. In this manner, the holder 2 is supported resiliently movably in the focusing direction Z. In the spring receptacle 5 there are formed slits into which the ends of the springs 29a and 29b are inserted.

In the spring receptacle 5 there is formed a spherical surface 8 and a recess 7 is formed in this spherical surface 8. The spherical surface 8 has a center which situates near a center of the objective lens 1. The apparatus further comprises a carriage 14 having a projection 15 for fitting the spring receptacle 5. In the projection 15, there is formed a spherical surface 17 which substantially corresponds to the spherical surface 8 of the spring receptacle 5. In the spherical surface 17 there is formed a groove 16 into which the projection 7 of the spring receptacle 5 can be inserted. The spherical surface 8 of the spring receptacle 5 is mated with the spherical surface 17 of the carriage 14 and the projection 7 is inserted into the groove 16. The spring receptacle 5 and carriage 14 are coupled with each other by clamping a M-shaped spring clip 11 whose leg portions are snapped into recesses 9a and 9b formed in side walls of the spring receptacle 5, said side wall facing to the +Y and −Y directions.

The objective lens 1 has to be arranged such that its optical axis is perpendicular to a record medium not shown. In the present embodiment, the objective lens 1 can be rotated about the X axis by rotating the spring receptacle 5 about the projection 7, and at the same time the objective lens 1 can be rotated about the Y axis by moving the projection 7 along the groove 16. In this manner, the objective lens 1 can be tilted in any desired manner. The adjustment can be performed by moving the spring receptacle 5 by inserting pins into recesses 10a and 10b formed in the side walls of the receptacle, said side walls facing to the Y direction. After adjustment, the spring receptacle 5 is fixed to the carriage 14 by means of an adhesive agent. In this case, the adhesive agent is applied to a space between the carriage 14 and a projection 6c formed at an end portion of the spring receptacle 5 opposite to the spherical surface 8, and thus a cementing force is increased to suppress a resonance in a vicinity of the spring receptacle 5.

In FIG. 4, the end portion of the leaf spring 29a is arranged in a space formed between projections 6a and 6b provided at the end portion of the spring receptacle 5 opposite to the spherical surface 8 and a silicone gel is filled in the space between the projections 6a and 6b. The end portion of the leaf spring 29b is inserted into a slit via a space between the projections 6b and 6c of the spring receptacle 5 and a space between the projections 6b and 6c is filled with a silicone gel. In this manner, the projections 6c has a function to form the space for receiving the leaf spring 29a and a function to improve a cementing force.

To the carriage 14 are secured reflection mirror 12, permanent magnets 13a, 13b and tracking coils 22a, 22b by means of an adhesive agent. The tracking coils 22a and 22b are soldered to a flexible circuit board not shown and are connected to a circuit via the flexible circuit board. The focusing coils 4a and 4b are also soldered to flexible bans not shown and is connected to the circuit via the flexible circuit board of the tracking coils 22a and 22b. The flexible circuit board of the focusing coils 4a and 4b are extended from the holder 2 to the carriage 14 along the leaf spring 29a and is connected to the flexible circuit board of the tracking coils 22a and 22b. The permanent magnets 13a and 13b are embedded in the −Z side bottom wall of the carriage 14 as shown in FIG. 7 and are polarized in the Z direction.

Figure 1:
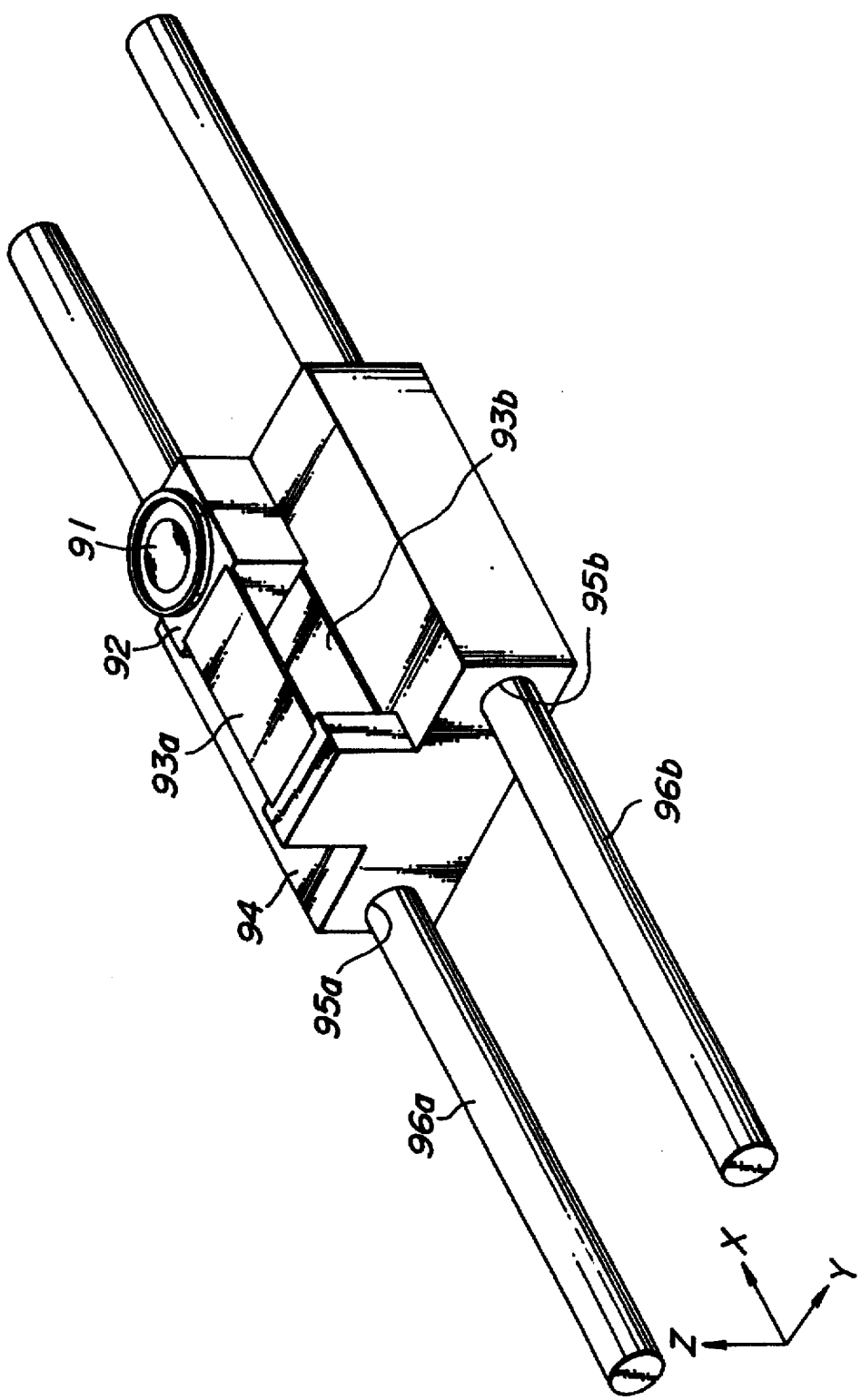
FIG. 1 is a perspective view showing a known optical system driving apparatus.
Figure 2:
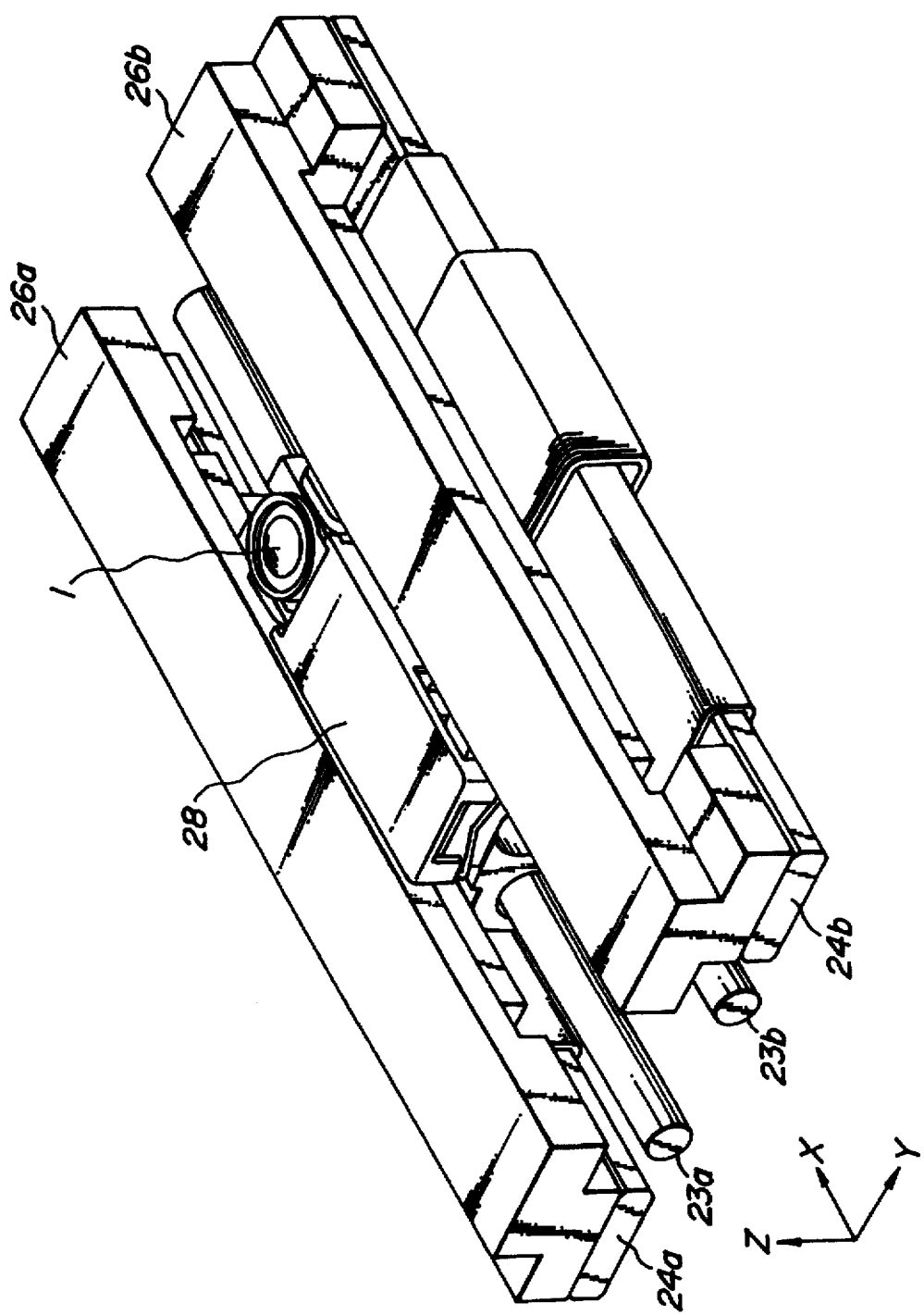
FIG. 2 is a perspective view illustrating an embodiment of the optical system driving apparatus according to the invention.
Figure 3:
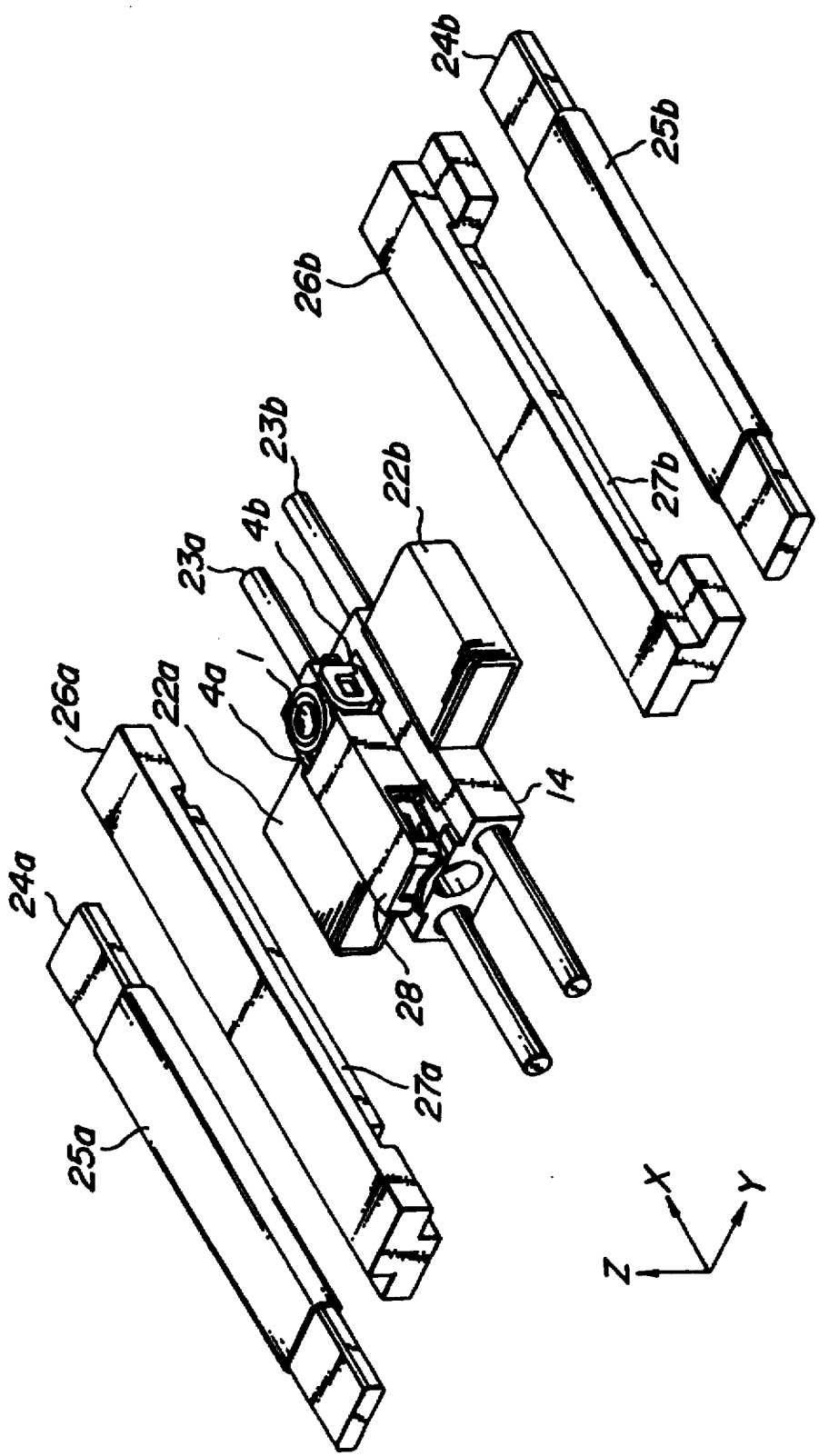
FIG. 3 is a perspective view depicting a portion of the apparatus shown in FIG. 2.

As best shown in FIG. 6, in the carriage 14 there are formed an opening 18 for transmitting a light beam and openings 19a and 19b through which shafts 23a and 23b shown in FIG. 3 pass, respectively. In the openings 19a and 19b, there are provided a main bearing 20 sliding on the shaft 23b and a driven bearing 21 sliding on the shaft 23a as illustrated in FIG. 7. In FIG. 7, spaces of the bearings are denoted to be large for the sake of clearness. The main bearing 20 has a cross section of a circle larger than the shaft 23 and cut by four planes. A distance between opposing planes is set to correspond to a bore having a fitting tolerance of G6 when a fitting tolerance of the shaft is h6. The driven bearing 21 has a cross section of a circle which is larger than a diameter of the shaft 23a and is cut by two parallel planes. A distance between the two planes is set to correspond to a bore of a fitting tolerance of G6 when the shaft 23b is a shaft having a fitting tolerance of h6. Therefore, a deviation from a parallel configuration of the shafts 23a and 23b in the direction parallel with the two planes is compensated for. As shown in FIG. 2, a top cover 28 is secured to the carriage 14 such that the leaf springs 29a and 29b are covered with the top cover 28. In this manner, the leaf springs 29a and 29b are protected by the top cover 28 and a movement of the holder 2 in the +Z direction is limited.

In the present embodiment, the bearings 20 and 21 are formed integrally with the carriage 14, and thus are made of a slidable material such as a thermoplastic polyimide resin containing carbon fibers. The shafts 23a and 23b are made of stainless steel and have coatings of polyethylene tetrafluoride resin.

Figure 7:
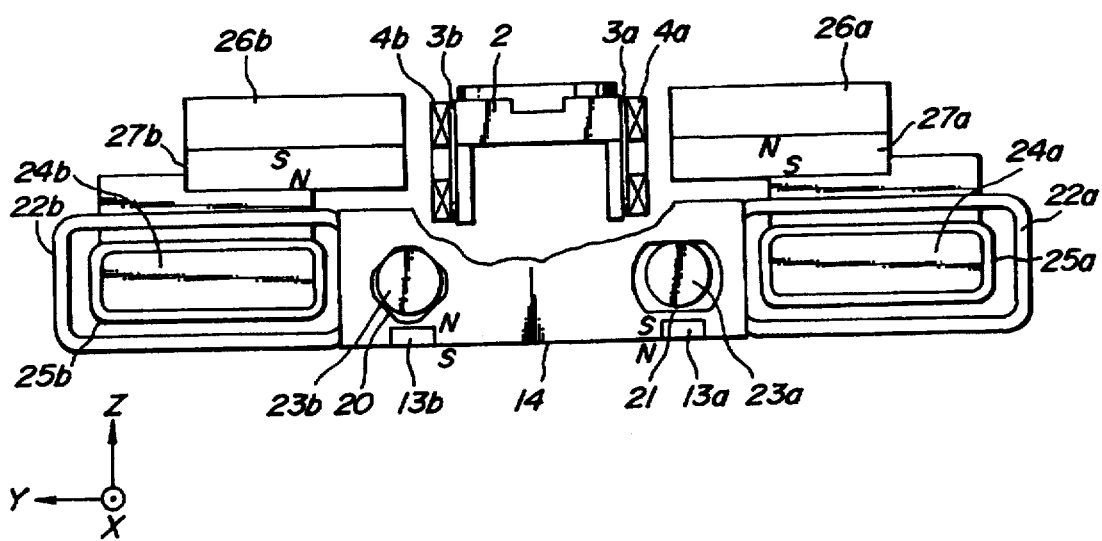
FIG. 7 is a cross sectional view illustrating a major portion of the apparatus shown in FIG. 2.

As shown in FIGS. 3 and 7, inner yokes 24a and 24b are inserted into the tracking coils 22a and 22b, respectively. These inner yokes 24a and 24b are secured to a deck base not shown, and short rings 25a and 25b formed by a copper sheet having a thickness of about 0.2 mm are provided around the yokes 24a and 24b, respectively. There are further provided outer yokes 26a and 26b which are connected to the inner yokes 24a and 24b, respectively. The outer yokes 26a and 26b are arranged in the +Z direction with respect to the inner yokes 24a and 24b, respectively. Permanent magnets 27a and 27b are secured to the outer yokes 26a and 26b, respectively by means of an adhesive agent. The permanent magnets 27a and 27b are polarized in the Z direction as shown in FIG. 7 and are arranged to be opposed to the focusing coils 4a and 4b, respectively.

In the present embodiment, the permanent magnets 27a and 27b are polarized in opposite directions such that magnetic fields between the magnets 27a and 27b extend in the direction Y facing toward sides of the magnets. Therefore, magnetic fluxes passing across the focusing coils 4a and 4b become strong and an undesired leakage of magnetic flux in the direction Z is decreased. This is effective for an opto-magnetic record medium. Opposing surfaces of the magnets 27a, 27b secured to the stationary member and the magnets 13a, 13b secured to the carriage 14 are polarized in the same direction, and thus a repelling force is generated between these magnets. Due to this repelling force, the magnets 13a, 13b and carriage 14 are subjected to a driving force in the −Z direction such that the shaft 23b is urged against the two +Z side planes of the main bearing 20 and the shaft 23a is urged against the +Z side plane of the driven bearing 21. In this manner, the main bearing 20 and driven bearing 21 can be stably brought into contact with the shafts 23b and 23a, respectively and the shafts and bearings and carriage 14 can be kept into correct positions.

Next, an operation of the present embodiment will be explained. A laser beam emitted from a stationary optical block not shown is transmitted through the opening 18 formed in the carriage 14 and is reflected by the mirror 12. Then, the laser beam is projected by the objective lens 1 onto the record medium not shown as a fine spot. A laser beam reflected by the record medium is collected by the objective lens 1 and is returned to the stationary optical block. By processing the thus returned laser beam, there are produced focusing error signal, tracking error signal and information signal.

When a current corresponding to the detected focusing error is supplied to the focusing coils 4a and 4b, the focusing coils are subjected to driving forces due to the leaked magnetic fluxes from the side surfaces of the magnets 27a and 27b, and thus the holder 2 is moved in the focusing direction Z. When a current corresponding to the detected tracking error is supplied to the tracking coils 22a and 22b, the tracking coils 22a and 22b receive driving forces from the magnets 27a and 27b, and the holder 2 is moved in the tracking direction X together with the carriage 14. In case of accessing a desired track, a current is supplied to the tracking coils 22a and 22b and the holder 2 is moved in the tracking direction X together with the carriage 14. In this manner, the objective lens 1 secured to the holder 2 is subjected to the focusing control, tracking control and access control.

During the tracking control and access control, the leaf springs 29a and 29b are existent between the objective lens 1 and the tracking coils 22a, 22b receiving the driving forces, and thus the resonance characteristic of the objective lens might be degraded. FIG. 8 is a graph showing a frequency characteristic of the tracking control or access control. However, in the present embodiment, the focusing coils 4a and 4b are secured to the holder 2 by means of the viscoelastic members 3a and 3b, respectively, and the assembly of the viscoelastic members and focusing coils effectively serve as a dynamic damper. Therefore, a resonance shown by a broken line A in FIG. 8 is damped into a resonance shown by a solid line B. Also in the focusing control, a large resonance does not appear as shown by C in a focusing characteristic curve shown in FIG. 9, because the viscoelastic members 3a and 3b have a large damping property.

As stated above, in the present embodiment, although the springs 29a and 29b are existent between the objective lens 1 and the tracking coils 29a and 29b, respectively, undesired resonance due to the springs can be effectively suppressed by securing the focusing coils 4a and 4b to the holder 2 by means of the viscoelastic members 3a and 3b, respectively. The viscoelastic members 3a, 3b are liable to be hardened at a low temperature and therefore its damping property is decreased. However, since the viscoelastic members 3a, 3b are arranged in the vicinity of the focusing coils 4a, 4b generating heat, the decrease in the damping property of the viscoelastic members 3a, 3b can be avoided. Furthermore, the viscoelastic members 3a, 3b can suppress the resonance of the holder 2 itself and can suppress a vibration of the holder due to the resonance of the carriage 14.

In the present embodiment, the viscoelastic members 3a, 3b are made of acrylic polymer resin, but according to the invention use may be made of an adhesive agent of butyl rubber. It should be noted that the present invention may be applied to the optical system driving apparatus including a spring mechanism for supporting the holder movably not only in the focusing direction but also in the tracking direction. Now such an apparatus will be explained as a second embodiment.

Figure 10:
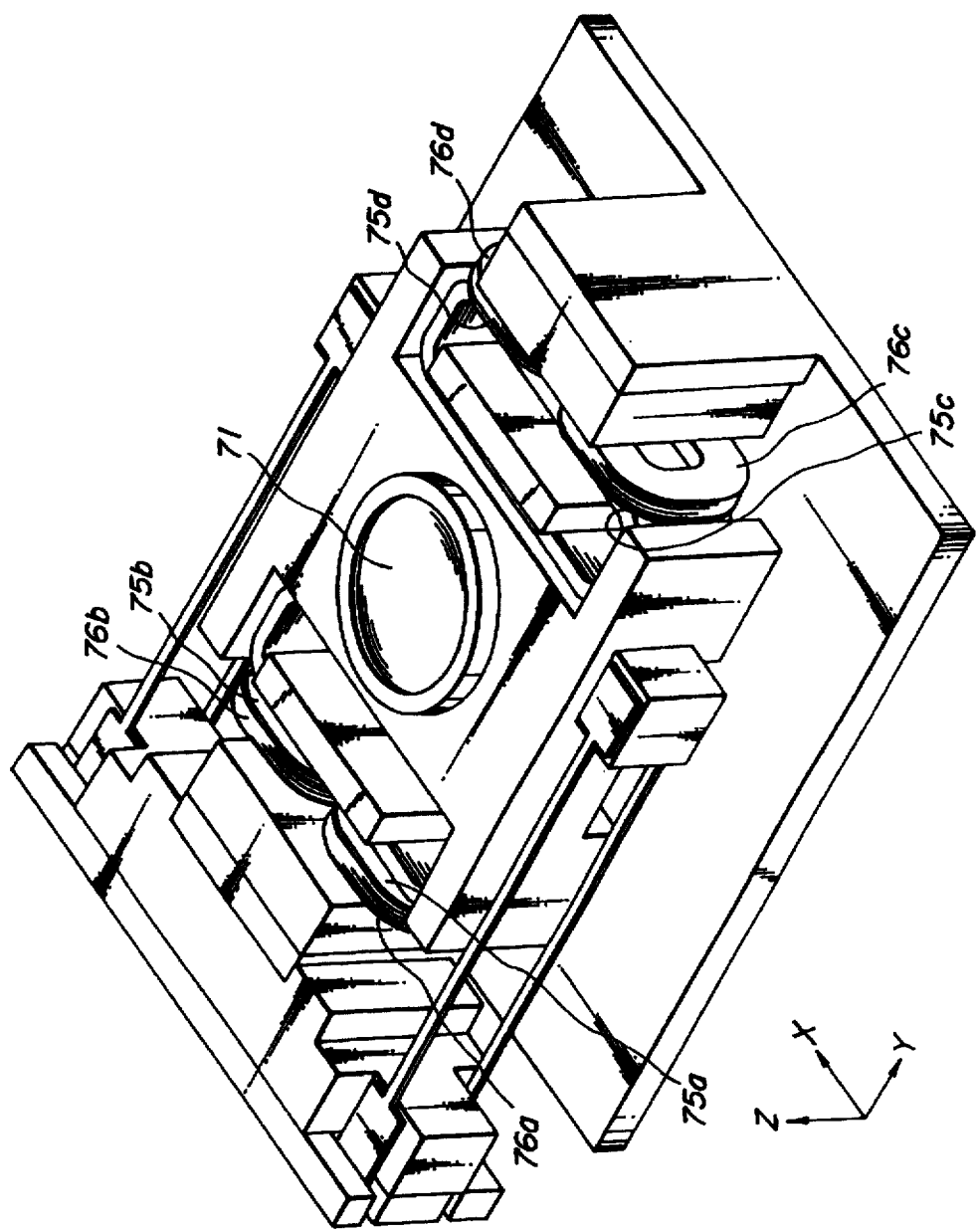
FIG. 10 is a perspective view illustrating a second embodiment of the optical system driving apparatus according to the invention.
Figure 11:
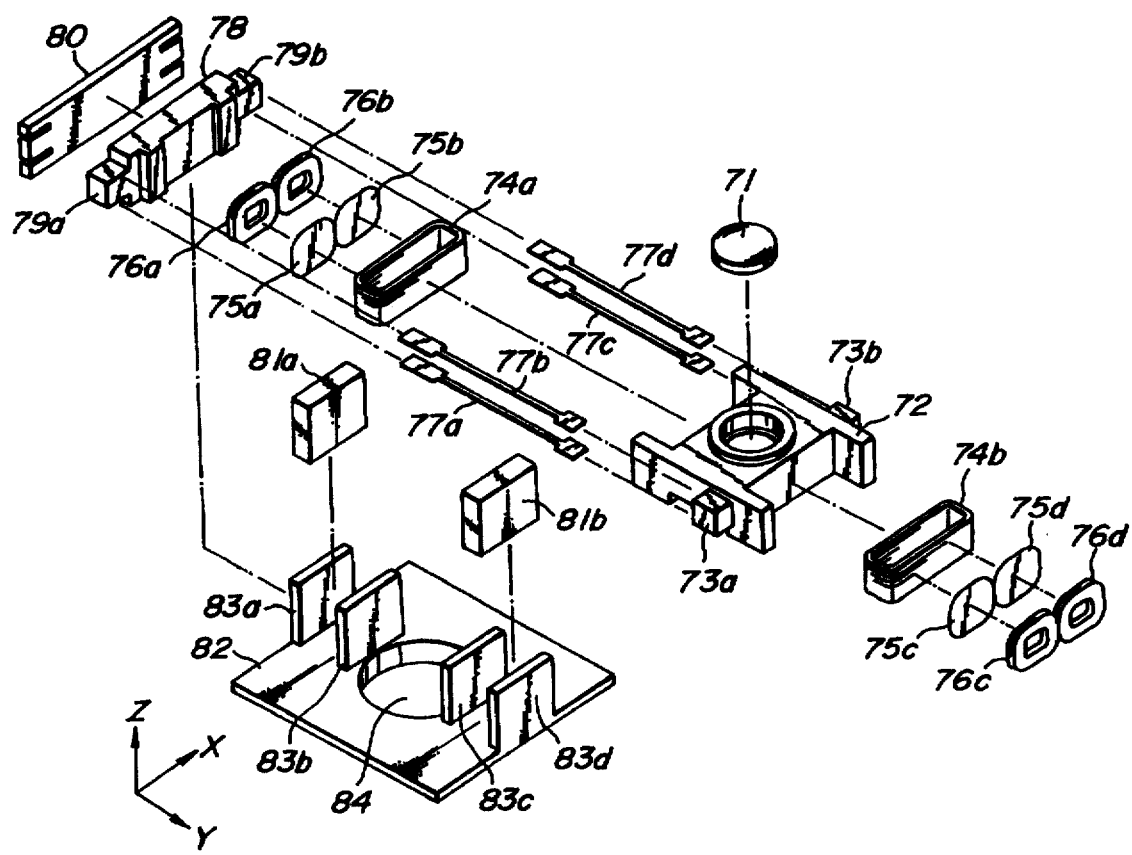
FIG. 11 is an exploded perspective view of the apparatus shown in FIG. 10.

FIGS. 10 and 11 show a second embodiment of the optical system driving apparatus according to the invention. An objective lens 71 is secured to a holder 72 by means by an adhesive agent. To the holder 72 are also secured focusing coils 74a and 74b by means of an adhesive agent. To the focusing coils 74a and 74b are secured tracking coils 76a and 76b, and 76c and 76d, respectively by means of viscoelastic sheet-like members 75a–75d. At both sides of the holder 72 viewed in the tracking direction X, there are formed projections 73a and 73b, and one ends of springs 77a–77d are cemented on top and bottom surfaces of the projections by means of an adhesive agent. The springs 77a–77d are formed by etching a metal sheet. The springs 77a–77d are soldered to the corresponding focusing coils 74a, 74b and tracking coils 76a, 76b. That is to say, the springs 77a–77d are also used as an electric conductor.

The other ends of the springs 77a–77d are secured to top and bottom surfaces of projections 79a and 79b formed on opposite side walls of a spring receptacle 78 viewed in the tracking direction X by means of an adhesive agent. In this manner, the holder 72 is supported by the springs 77a–77d movably in the focusing direction Z as well as in the tracking direction X. To the spring receptacle 78 is secured a substrate 80 and the other ends of the springs 77a–77d are soldered to the substrate. The substrate 80 is connected via a flexible circuit board not shown to a circuit also not shown. From this circuit, electric currents are supplied to the focusing coils 74a, 74b and tracking coils 76a–76d by means of the flexible circuit board, substrate 80 and springs 77a–77d to perform the focusing control and tracking control.

There is further provided a base member 82 and yokes 83a–83d are provided on a surface of the base member. The yokes 83b and 83c are inserted into the focusing coils 74a and 74b, respectively, and the yokes 83a and 83d are provided to oppose to the tracking coils 76a, 76b and 76c, 76d, respectively. The spring receptacle 78 is secured to the yoke 83a by means of screws not shown. Permanent magnets 81a and 81b are secured to inner surfaces of the yoke 83a and 83d, respectively by means of an adhesive agent. In the base member 82, there is further formed an opening 84 for transmitting a laser beam toward the objective lens 71 held by the holder 72. The base member 82 is provided on a carriage not shown.

The apparatus of the present embodiment operates as follows. A laser beam emitted by an optical block not shown is reflected by a mirror not shown and is made incident upon the objective lens 71 via the opening 84 of the base member 82. The laser beam is then made incident upon a record medium and is reflected thereby. The laser beam reflected by the record medium is collected by the objective lens 71 and is made incident upon photodetectors provided in the optical block. In this manner, focusing error signal, tracking error signal and information signal are derived.

A current corresponding to the detected focusing error is supplied to the focusing coils 74a and 74b and the focusing coils receive driving forces due to magnetic fields produced by the magnets 81a and 81b. Then, the holder 72 is moved in the focusing direction Z. When a current corresponding to the detected tracking error is supplied to the tracking coils 76a–76d, driving forces exert on the tracking coils and the holder 72 is moved in the tracking direction X. In this manner, the holder 72 and thus the objective lens are subjected to the focusing control and tracking control. The access control may be performed by moving the carriage not shown like as the first embodiment.

In the present embodiment, the tracking coils 76a–76d are secured to the holder 72, and thus there is not existent any spring therebetween. However, if the viscoelastic members 75a–75d are not provided, there might occur undesired resonance in the springs 77a–77d due to a deviation between a point of gravity and a driving point during the focusing control and tracking control. In the present embodiment, the tracking coils 76a–76d are secured to the holder 72 by means of the viscoelastic members 75a–75d, and therefore the tracking coils can serve as a dynamic damper and undesired resonance of the springs 77a–77d can be effectively suppressed. In this manner, it is possible to provide the useful optical system driving apparatus having a wide control frequency range. It should be noted that in the present embodiment, all the tracking coils 76a–76d are secured to the holder 72 by means of the viscoelastic members 75a–75d, but according to the invention one or two or three tracking coils may be secured to the holder by means of the viscoelastic members or at least one of the focusing coils 74a and 74b may be secured to the holder by means of viscoelastic members.

FIG. 12 is an exploded perspective view showing a third embodiment of the optical system driving apparatus according to the invention. In the present embodiment, portions similar to those of the first embodiment are denoted by the same reference numerals used in the first embodiment. On side walls of a holder 2 facing to the +Y and −Y directions, there are provided spring portions 2a which have a small thickness in the direction X and extend in the direction Z. On the spring portions 2a are further provided fitting plates 2b to which focusing coils 4a and 4b are secured by means of an adhesive agent. It should be noted that the holder 2, spring portions 2a and fitting plates 2c are integrally formed by a molding of plastics such as LCP (liquid crystal polymer) and PC (polycarbonate). It is particularly preferable to form these parts by a molding of LCP having a large internal loss. The remaining construction of the present embodiment is identical with the first embodiment.

In the present embodiment, the spring portions 2a have a large stiffness in the direction Z, but have a small stiffness in the direction X. Therefore, the focusing coils 4a and 4b are liable to vibrate in the direction X, but do not substantially vibrate in the direction Z. Therefore, by suitably setting a weight of the focusing coils 4a and 4b and the stiffness of the spring portions 2a, the focusing coils and spring portions can serve as a dynamic damper, and therefore a vibration of the holder 2 in the direction X due to a resonance of the springs 29a and 29b (see FIG. 4) can be effectively suppressed.

In the present embodiment, the spring portions 2a are provided integrally with the holder 2, the number of parts is not increased at all and the apparatus becomes less expensive. Moreover, the spring portions 2a have a large stiffness in the direction Z, and thus the spring portions do not vibrate in the direction Z during the focusing control so that the frequency characteristic of the focusing control is not degraded. In this case, the spring portions 2a may be made of plastics and rubber, and a degree of freedom in designing the spring portions can be enhanced.

As explained above in detail, according to the invention, by securing the coils to the holder by means of the viscoelastic members, these members can be used as a dynamic damper and undesired resonance of the holder due to the resilient supporting members can be effectively suppressed. Moreover, a resonance of the holder transmitted to the holder via the resilient supporting members can be also suppressed. Therefore, the present invention can provide a novel and useful optical system driving apparatus having a high performance over a wide frequency range extending to a higher frequency.

What is claimed is:

1. An optical system driving apparatus comprising:
   a holder means for holding an optical system;
   a supporting means for supporting resiliently said holder means movably in a first direction which is substantially perpendicular to a record medium and/or a second direction which is substantially perpendicular to said first direction;
   a coil means secured to said holder means for driving said holder means in said first and/or second direction; and
   a viscoelastic means for securing at least a part of said coil means to said holder means.

2. An apparatus according to claim 1, wherein said viscoelastic means comprises a viscoelastic member which is formed by a molding together with the holder means.

3. An apparatus according to claim 2, wherein said viscoelastic member is formed by a molding of LCP or PC.

4. An apparatus according to claim 1, wherein said viscoelastic means has a larger stiffness in the direction in which the holder means is driven than a stiffness in another direction.

5. An apparatus according to claim 1, wherein said supporting means comprises a pair of leaf springs extending in the second direction for supporting said holder means movably in the first direction, one ends of the leaf springs are secured to the holder means, the other ends of the leaf springs are secured to a carriage via a spring receptacle, said carriage is supported to move in the second direction, said coil means comprises focusing coils secured to the holder means and tracking coils secured to the carriage, and said viscoelastic means comprises viscoelastic sheet-like members for securing the focusing coils to the holder means.

6. An apparatus according to claim 5, wherein said spring receptacle and carriage are coupled with each other such that a mutual position can be adjusted.

7. An apparatus according to claim 5, wherein said viscoelastic sheet-like members are made of acrylic high polymer or butyl rubber.

8. An apparatus according to claim 1, wherein said supporting means comprises four springs extending in the second direction for supporting said holder means movably in the first and second directions, one ends of the springs are secured to the holder means, the other ends of the springs are secured to a carriage arranged movably in the second direction, said coil means comprises focusing coils secured to the holder means and tracking coils secured to the focusing coils, and said viscoelastic means comprises viscoelastic sheet-like members for securing the tracking coils to the focusing coils.

9. An apparatus according to claim 8, wherein said viscoelastic sheet-like members are made of acrylic high polymer or butyl rubber.

* * * * *